United States Patent [19]

MacQueen et al.

[11] 4,406,743

[45] Sep. 27, 1983

[54] FRACTIONATION COLUMN FOR RECLAIMING USED LUBRICATING OIL

[75] Inventors: Donald K. MacQueen; William E. Wood, both of Bartlesville, Okla.

[73] Assignee: Phillips Petroleum Company, Bartlesville, Okla.

[21] Appl. No.: 422,776

[22] Filed: Sep. 24, 1982

Related U.S. Application Data

[62] Division of Ser. No. 273,297, Jun. 15, 1981.

[51] Int. Cl.$^3$ .................. C10G 7/04; C10G 7/06; C10G 25/00

[52] U.S. Cl. ............................ 196/46; 196/100; 196/102; 202/161

[58] Field of Search .............. 273/297; 208/179, 185, 208/356, 357; 196/46, 100, 102; 202/153, 159, 161; 261/2, 95

[56] References Cited

U.S. PATENT DOCUMENTS

| | | | |
|---|---|---|---|
| 1,953,939 | 4/1934 | Jones | 208/356 |
| 2,952,631 | 9/1960 | Hausch | 196/102 |
| 3,173,859 | 3/1965 | Chambers | 208/184 |
| 3,216,909 | 11/1965 | Bress | 202/159 |
| 3,301,778 | 1/1967 | Cabbage | 208/356 |
| 3,320,159 | 5/1967 | Potts | 202/161 |
| 3,567,628 | 3/1971 | Van Pool | 196/102 |
| 3,844,898 | 10/1974 | De Graff | 196/100 |
| 3,871,969 | 3/1975 | Chapman | 202/153 |
| 4,046,638 | 9/1977 | Fickel | 202/153 |

*Primary Examiner*—Bradley Garris

[57] ABSTRACT

A novel process for the purification of used oil comprising removing the ash-forming components, then subjecting the oil to vacuum fractionation. A novel vacuum fractionation column is also disclosed.

9 Claims, 1 Drawing Figure

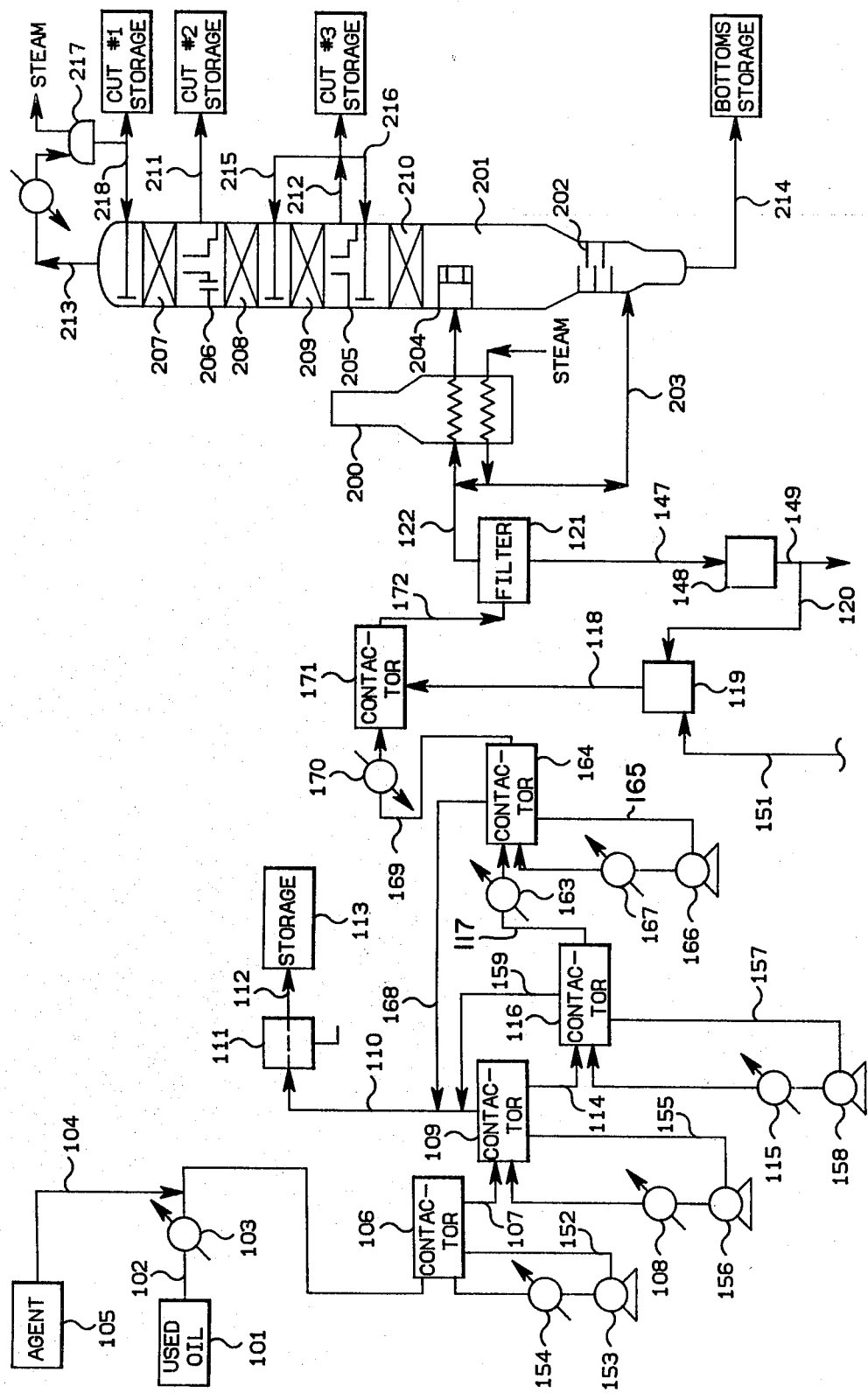

FRACTIONATION COLUMN FOR RECLAIMING USED LUBRICATING OIL

CROSS REFERENCE TO RELATED APPLICATION

This is a divisional of copending application Ser. No. 273,297, filed June 15, 1981.

BACKGROUND

This invention relates to a method for reducing the ash-content of lubricating oil containing ash-forming components. In another aspect this invention relates to a method for the treatment of used lubricating oils to obtain purified oil suitable for use as fuel oil, in grease formulations, or in the preparation of lubricating oil formulations.

BACKGROUND OF INVENTION

Used motor oil has been estimated as being generated in the United States at a rate of about 1.1 billion gallons per year. Some of this used oil has been used as furnace oil and some has been used on rural dirt roads for dust control. Much of the oil has been merely discarded in sewers, dumps, and back alleys. With the ever decreasing petroleum reserves, it becomes more and more essential that this used oil be saved and used as long as possible.

One major obstacle to re-use of used oil in many applications involves the presence of various ash-forming impurities that remain dispersed in the oil due to the very effective dispersant characteristics of the additives in modern day lubricant systems.

Materials contained in a typical used crankcase oil that are considered to contribute to the ash content of the oil include sub-micron size carbon particles, inorganic materials such as atmospheric dust, metal particles, lead and other metal compounds originating from fuel combustion. Besides lead, which is generally present at concentrations of 1.0 to 2.5 weight percent, appreciable amounts of zinc, barium, calcium, phosphorus and iron are also present in the used crankcase oil. Examination of the used oil under an optical microscope at 600 magnifications reveals the very effective dispersant characteristics of modern day lube oils. The particle size of the particulates is estimated from this microscopic examination to be 0.1-1.0 microns with virtually no occurrence of agglomerates in the oil.

The presence of the ash-forming components in used oil puts limits on the extent to which the material can be used economically without ecological damage. For example, reuse of the used oil as fuel oil can give rise to serious atmospheric pollution when the oil contains in excess of one percent lead. Also, such fuel oil often results in burner and refractory maintenance costs that offset the purchase price differential between used oil and regular furnace oil.

Clearly, it is in the national interest to provide economical ways of removing the impurities from used oil so that it can be reused practically.

Recently, a technique of purifying used oil has been developed in which the used oil is reacted with an aqueous solution of an ammonium salt treating agent, then the water phase is removed, and the resulting oil phase containing mass is separated by filtration. Such a technique is described in U.S. Pat. No. 4,151,072, the disclosure of which is incorporated herein by reference.

It is an object of this invention to provide an improvement on the method disclosed in U.S. Pat. No. 4,151,072.

In another aspect it is an object of the present invention to provide a means of obtaining from used motor oil a plurality of oil fractions suitable for reuse in forming blended oil formulations.

One embodiment of this invention provides a means of obtaining such useable fractions without the use of hydrotreating.

Another embodiment of this invention provides a means of reducing the severity of the conditions to which a hydrotreating catalyst must be exposed to produce the desired fractions.

Still another object of the present invention is to increase the catalyst life of the employed hydrotreating catalyst.

Still yet another object of the present invention is to reduce the amount of hydrogen needed in the reclaiming process.

SUMMARY OF THE INVENTION

In accordance with the present invention, a process is provided for the production of an essentially ash free oil stock from a lubricating oil containing ash-forming components comprising:

(1) contacting said lubricating oil with an aqueous solution of a treating agent comprising an ammonium salt capable of reacting with the ash forming components and rendering them removable under conditions sufficient to disperse said agent in said lubricating oil and react said agent with ash-forming components of said lubricating oil;

(2) removing a major portion of the water from the mixture resulting from combining said aqueous solution and said lubricating oil;

(3) separating solids from the oil resulting from step (2) to obtain a partially purified oil; and (4) vacuum distilling the partially purified oil with steam dilution to obtain a plurality of boiling range oil fractions characterized by the fact that said steam dilution is provided by a combination of operating steam added to the bottom of the fractionating column below the oil feed inlet and mixing steam added to the partially purified oil prior to its introduction into the fractionating column wherein said operating steam flows throughout said column.

Also in accordance with the present invention, there is provided a novel fractionation column useful for the vacuum fractionation of used lubricating oil.

DESCRIPTION OF THE DRAWING

The FIGURE is a schematic representation of a specific process employing the present invention.

DETAILED DESCRIPTION OF THE INVENTION

The present invention is applicable to the de-ashing of oil in which ash forming components can be rendered removable by the treating agent. The invention is particularly applicable to the purification of oils that have been used for internal combustion engine lubrication purposes such as crankcase oils, e.g., in gasoline engines or diesel engines. Other sources of used oils include steam-turbine oils, transmission and gear oils, steam-engine oils, hydraulic oils, heat-transfer oils and the like.

The oils generally used for preparing internal combustion engine lubricants are the refinary lubricating cuts from paraffin-base, mixed-base, or naphthenic crudes. Their viscosities are generally in the range of from about 100 to about 1,800 SUS at 100° F. The oils also contain various additives such as oxidation inhibitors (e.g., barium, calcium, and zinc alkyl thiophosphates, di-t-butyl-p-cresol, etc.), antiwear agents (e.g., organic lead compounds such as lead diorganophosphorodithioates, zinc dialkyldithiophosphates, etc.), rust inhibitors (e.g., calcium and sodium sulfonates, etc.) dispersants (e.g., calcium and barium sulfonates and phenoxides, etc.), viscosity index improvers (e.g., polyisobutylenes, poly-(alkylstyrenes), etc.), detergents (e.g., calcium and barium salts of alkyl benzene sulfonic acids) and ashless-type detergents such as alkyl-substituted succinimides, etc.

If desired, water entrained in the untreated used lubricating oil can be removed before use of same in the process of this invention. Such a separation can be readily achieved by removal of the water phase which may occur in the storage tanks for the used lubricating oil.

The ammonium salt treating agents which are useful in the process of the present invention are those selected from the group consisting of ammonium sulfate, ammoniu, bisulfate, ammonium phosphate, diammonium hydrogen phosphate, ammonium dihydrogen phosphate, ammonium thiosulfate, ammonium polyphosphates such as ammonium metaphosphate, urea sulfate, guanidine sulfate, urea phosphate, and guanidine phosphate, and mixtures thereof. Said treating agents can be formed in situ if desired as, for example, by combining ammonia and/or ammonium hydroxide with sulfuric acid and/or phosphoric acid and/or an ammonium hydrogen sulfate or phosphate, i.e., ammonium bisulfate, diammonium hydrogen phosphate, and/or ammonium dihydrogen phosphate. When the treating agent is formed in situ, the reactants employed can be introduced at the same time, or one after the other.

Although the concentration of treating agent in the aqueous solution of treating agent is not critical and more dilute solutions can be used, the economics of the process are enhanced by the use of relatively concentrated solutions in order that the amount of water to be removed subsequently will not be great. Generally, the concentration of treating agent in the aqueous solution will be within the range of about 30 to about 95 weight percent, typically about 80 weight percent, of that in an aqueous solution that is saturated with the treating agent at 25° C. Frequently some water will be found in used oil, and in these instances the concentration of the treating agent can be adjusted accordingly.

In the process of this invention, the treating agent should preferably be employed in an amount at least sufficient to react with essentially all of the metal constituents in the used oil. Although the weight ratio of the treating agent to the oil can vary greatly, depending in part upon the nature and concentration of metal-containing components in the oil and on the particular treating agent employed, generally it will be within the range of about 0.002:1 to about 0.05:1, most often being within the range of about 0.005:1 to about 0.015:1, and typically being about 0.01:1. Although larger amounts of treating agent can be used, in most instances this would be wasteful of treating agent.

Water can be removed from the mixture resulting from the combination of the aqueous solution and the oil by any suitable means. Distillation is the preferred method of removing water. Generally, the distillation is carried out at a temperature in the range of about 100° to about 140° C. and a pressure in the range of about 5 to about 25 psig for a period of time sufficient to effect removal of a major portion of the water. Light hydrocarbons contained in the oil that boil under the distillation conditions, e.g. gasoline, will be, of course, separated from the oil along with the water.

The solids are separated from the treated oil in any suitable manner. Currently filtering is the preferred technique. Generally, it is desirable to use a filter aid in the filtration process. Filter aids which are useful in the practice of the invention include those selected from the group consisting of diatomaceous earth, perlite, and cellulose fibers. The presently preferred filter aid is diatomaceous earth.

It is further currently preferred to expose the oil to a heat soak at a temperature in the range of about 320° C. to about 420° C. prior to the filtration step. Such a procedure is disclosed in U.S. Pat. No. 4,247,389, the disclosure of which is incorporated herein by reference. Typically, such a heat soak is connected at pressures in the range of about atmospheric to about 400 psig.

The partially purified oil is next vacuum distilled to produce a plurality of different boiling range oil fractions. The vacuum distillation should be carried out under conditions which minimize cracking and coking of the oil.

An especially preferred technique for achieving that end is to provide high dilution with superheated steam in the vacuum fractional distillation column. The temperature in the fractionation column is kept below 700° F. Preferably, the maximum temperature is no greater than 650° F. and the pressure is in the range of about 90 to 200 mm Hg, most preferably about 93 to 103 mm Hg (1.8–2.0 psia). The steam added to the bottom of the column below the point of introduction of the oil feed is generally used in amounts equal to about 0.05 to 0.2 weight percent of the oil feed, preferably about 0.1.

In an especially preferred embodiment superheated steam is also added to the oil feed prior to the passage of the oil feed through the heater where it is heated for transfer into the fractionator. The use of steam in this fashion adds dilution and helps minimize decomposition of the oil in the heat exchanger coils of the heater.

The various fractions obtained can be collected in storage vessels and further processed separately or in a combined fashion as desired. If processed separately, the fractions needing additional purification can be passed through a single decolorizing and deodorizing zone in a blocked out fashion, i.e. one after the other as desired. Alternatively, the separate fractions can be passed through decolorizing and deodorizing zones especially adapted for that specific fraction. Even if the various lubricating oil fractions are recombined and passed through a single decolorizing and deodorizing zone, the products obtained are generally of a much better quality than those obtained in the prior art processes in which the heavies were not removed before the final purification.

The bottoms from the fractionation column which being heavier than what would generally be used in blending lubricating oils are relatively metal free and can be further processed for other uses, such as heavy gear oils or asphalt additives. If desired the heavies can be sent to a cracking zone to produce fuel fractions.

The decolorizing and deodorizing step or steps can be carried out by any of several processes useful for that purpose, for example, clay treating or mild hydrogenation. Although the hydrogenation method is preferred, it is more expensive and satisfactory products can be obtained by using only clay treating.

In clay-contacting, excellent results are attainable by mixing the oil with from 0.2 to about 1 lb of clay per gallon oil, preferably 0.3 to 0.5 lbs/gallon, and heating the resultant slurry to from 300° to 700° F., preferably about 500° to 650° F., for periods of 30 minutes to 3 hours. Times longer than about 3 hours encourage oxidation of the oil, while larger quantities of clay merely increase the amount of waste which must be disposed of. Oxidation may also be controlled by introducing an inert atmosphere such as $H_2$ or $N_2$ into the tank. Alternatively, a steam sparge will also provide excellent results, since, in addition to controlling oxidation, it helps to sweep impurities from the oil. It is preferred that the oil and clay be separated as soon as possible after the contact time is met to obtain a better product. Separation can be accomplished by any well-known separation method such as filtering. Any acidactivated bleaching clay such as Filtrol grade 20 ®, Superfiltrol ® or Tonsil ® was found to provide satisfactory results.

Mild hydrogenation as an alternative process to effect odor and color improvement of the reprocessed lubricating oil is preferred if adequate quantities of hydrogen are available at practical prices. Typical conditions of hydrogenation to produce a satisfactory finished lubricating oil with neutral odor and light color include an operating temperature of aout 600°–700° F. with a temperature in the range of 650° F. preferred. The hydrogen partial pressure may range between about 400 to 900 psig, with a preferred level near 650 psig. Space velocities may vary between about 0.5 and 2.5 vol/vol/hr with a preferred value of 1. Hydrogen rates of from 250–2000 Standard Cubic Foot/Barrel (SCFB) have been found satisfactory, with a rate of 1500 SCFB being preferred. The catalyst employed may be substantially any of the known hydrofinishing catalysts which promote desired reactions which result in the removal of undesirable unsaturated materials and polar compounds. A metal of Groups II-A, II-B, VI-B, or VIII of the Periodic Table of Elements, an oxide of a metal of Groups II-A, II-B, VI-B, or VIII, or a sulfide of a metal of Groups II-A, II-B, VI-B, or VIII is satisfactory as catalyst material. Typical catalysts are cobalt molybdate and nickel molybdate on an inert substrate such as alumina.

A further understanding of the present invention will be provided by the following description of a preferred embodiment of the present invention as illustrated in the FIGURE.

Referring now to the FIGURE, used oil from storage tank 101 is passed via line 102 to heater 103 and contactor 106. Aqueous treating agent such as diammonium hydrogen phosphate from makeup tank 105 is introduced via line 104. If desired, agent precursors ammonia, phosphoric acid, and water can be introduced into the heated oil downstream of heater 103, thereby forming the treating agent in situ in line 102 and contactor 106. The oil from heater 103 is passed in admixture with treating agent into the first agitated contactor 106 wherein the mixture is maintained under agitation for a time sufficient to react with at least a portion of the ash-forming components in the oil. Preferably, a recycle stream is passed through conduit 152 to pump 153 and then through heater 154 before its return to contactor 106, thereby providing heat and agitation to the contents of the contactor. Stirring means also can be employed.

Thereafter the mixture is passed via conduit 107 to second contactor 109, which is maintained at a temperature in the range of about 110° to about 140° C., for a time sufficient to effect distillation of a major portion of the water and at least some of the light hydrocarbons present therein. Thus, while retained in contactor 109, essentially all of the water and at least a portion of the light hydrocarbons components of the mixture are removed via line 110 and passed to separator 111 wherein a hydrocarbon layer and a water layer are allowed to form. The hydrocarbon phase can then be transferred via line 112 to storage 113. The water layer can be removed and discarded or employed for any desired purpose. Preferably, a recycle stream is passed through conduit 155 to pump 156 and then through heater 108 before its return to contactor 109, thereby providing heat and agitation to the contents of the reactor. Stirring means also can be employed.

The resulting mixture comprising a hot oil phase which is essentially free of water is passed via conduit 114 to a third contactor wherein it is subjected to agitation and a temperature in the range of about 140° to about 200° C. to remove additional water and lighter components. Preferably, a recycle stream is passed through conduit 157 to pump 158 and then through heater 115 before its return to contactor 116, thereby providing heat and agitation to the contents of the contactor. Any residual water and light hydrocarbons are removed from contactor 116 via line 159.

If desired, any one or two or all of contactors 106, 109 and 116 can be provided with jackets heated by steam or other source of heat to aid in maintaining the contents of the contactors at the desired temperatures. Any one or two or all of contactors 106, 109 and 116 can be equipped with stirrers to provide additional agitation. In an operable but presently less preferred arrangement, a stirrer in any one or more of the three contactors can be used instead of the recycle system employed with the corresponding one or more of the three contactors, any additional heating being provided by heaters in the line ahead of the contactors and/or by heated jackets around the contactors. Also, if desired, any one or two or all of conduits 102, 107 and 114 can feed into the recycle stream for contactors 106, 109 and 116, respectively, i.e., into conduits 152, 155 and 157, respectively, instead of directly into the respective contactor as shown. In one preferred technique the feed in conduit 102, rather than being passed directly into contactor 106, is passed into conduit 152 at the inlet side of pump 153. In a still more preferred technique, pump 153 is a high-volume pump that will cause the oil to flow in the turbulent flow range so as to promote heat transfer and decrease scaling in the conduit 152.

The heated oil from contactor 116 is passed via conduit 117 through heater 163 to a fourth contactor 164 wherein the mixture is subjected to agitation at a temperature in the range of about 320° to about 420° C. for a period of time sufficient to result in a product which when later filtered will contain less ash than it would contain if it had not been so heated. Preferably, a recycle stream is passed through conduit 165 to pump 166 and then through heater 167 before its return to contactor 164, thereby providing heat and agitation to the contents of contactor 164. Any residual water or light components can be removed from contactor 164 via line 168.

Treated oil from contactor 164 is passed through conduit 169 through a cooler 170 wherein the oil is cooled to a temperature in the range of about 150° to about 180° C. and then passed into a fifth contactor 171 wherein it is admixed with filter aid provided via conduit 118, preferably as a slurry in light hydrocarbons provided from makeup tank 119. In a presently, preferred embodiment, not illustrated, the oil from contactor 164 is cooled at least in part as a result of passing in indirect heat exchange with the feed passing through line 102 whereby the heat in the oil in line 169 is used to heat the feed oil in line 102.

Following admixture of filter aid, the resulting mixture is passed via line 172 to filter 121, which optionally can be precoated with filter aid. The use of the heat soak step of the present invention can in many cases result in a reduction in the amount of filter aid required for a suitable filtration rate.

Filter cake from filter 121 is removed via line 147 and optionally passed to furnace 148 from which, following burning or calcination, at least a portion of the resulting ash containing filter aid can be passed to waste via line 149 or recycled via conduit 120 to slurry makeup tank 119 for further use in the system. Fresh filter aid is added through conduit 151. Light hydrocarbons for use in preparing the slurry can be recovered from the integrated process and can be passed to tank 119 via conduit 151.

The filtered oil, being essentially free of ash-forming constituents is then combined with superheated steam and passed through a heater 200. The steam diluted oil feed is then passed into the lower portion of a vacuum fractionation column 201. Superheated steam is passed into an even lower portion of the vacuum fractionator. Distillation in the presence of this steam permits the vaporization and distillation of lube oil at moderate vacuum and at temperature conditions sufficiently low to avoid thermal decomposition of the oil fractions.

The preferred fractionating column illustrated in the FIGURE comprises five staggered 50% cut baffle plates 202, i.e., plates extending halfway across the column, located beneath the point of entry of the oil feed and above the point of entry of the operating steam provided via line 203. The oil feed combined with mixing steam is introduced into the column by way of a feed distributor 204 comprising a channel formed by a plate with weirs extending around approximately a third of the circumference of the column. The column 201 is divided into three main zones by total drawoff plate 205 and partial drawoff plate 206. Both plates 205 and 206 are provided with liquid overflow chimneys. Partial drawoff plate 206 is provided with a second liquid overflow chimney having an upper height between the upper height of the first chimney of that plate and the intermediate height of the partial drawoff plate. Four areas of static mixing packing material 207–210 are provided. Any suitable low pressure drop static mixing packing can be used. Examples include intalox saddles, sulzer, pall rings, and the like. Preferably, area 210 comprises a layer of KOCH Sulzer above a layer of intalox saddles such as Norton 40 Intalox. The layer of Intalox serves to protect the Sulzer from gumming and plugging.

The illustrated column allows for the withdrawal of two sidestream fractions via lines 211 and 212, an overhead fraction via line 213, and a bottoms fraction via line 214.

Portions of the fraction removed via line 212 are returned as liquid to liquid distributors in the column via lines 215 and 216. The overhead fraction is passed via line 213 to an accumulator 217 where steam and lighter hydrocarbons are separated from the oil to provide an overhead oil fraction. A portion of the overhead fraction is recycled via line 218 to a liquid distributor placed above packing 207.

The recycle provided via line 216 provides additional reflux to the system. The recycle provided via line 215 is employed to assure that the tray 205 does not run dry.

In a preferred embodiment, the steam from accumulator 217 along with the light hydrocarbons is cooled and passed to a phase separator where the hydrocarbons and water are separated. The recovered water is then recycled to provide at least part of the water used for producing operating steam for the fractionation column.

In a preferred embodiment, the fractionator is shaped as illustrated in the FIGURE. The section of the fractionator containing the trays and the packing is about 5 feet in diameter and about 40 feet in length. The section containing the 50% cut baffle plates is about 27 inches in diameter and about 6 feet in length. The section for bottoms accumulation beneath the operating steam inlet is about 18 inches in diameter and 3 feet in length.

The plate of the feed distributor extends inwardly to a point defined by an arc which at all points lies 18 inches from the adjoining wall of the column. The plate extends outward from about a third of the circumference of the column wall. Weirs extend upwardly from the interior edges of the plate about 18 inches high.

The first layer of packing 210 is located about 42 inches from the bottom of the 5 foot diameter portion of the column. That layer of packing preferably comprises a 1 foot layer of Norton 40 Intalox below a 2 foot layer of KOCH Sulzer.

The next layer of packing 209 is located about 72 inches above the top of packing 210 and comprises a 4 foot layer of KOCH Sulzer. The packing 208 is a 4 foot bed of KOCH Sulzer in turn located about 42 inches above the top of packing 209. And finally packing 207 is a 6 foot bed of KOCH Sulzer located about 69 inches above the top of packing 208.

This particular fractionator design allows for steady operation under a wide range of operating conditions. For example, it can be readily operated so that the overhead can be as much as 40 weight percent of the oil feed. Alternatively, it can be operated so that either cut #2 or cut #3 can be as much as 50 weight percent of the oil feed. Further, the column can be operated when as much as 15 weight percent of the oil feed is removed as bottoms. Typical examples calculated for the amounts of various streams under those extremes of operation is presented in Table I.

TABLE I

| Stream Feature | Feed (122) | Mixing Steam | Operating Steam (203) | Oily Steam (213) | Cut #1 | Reflux (218) | Cut #2 | Line 215 | Line 216 | Cut #3 | Bottoms |
|---|---|---|---|---|---|---|---|---|---|---|---|
| 40% Overhead | | | | | | | | | | | |
| Pounds/Day | 245746 | 9603 | 25330 | 35110 | 102039 | 60350 | 77729 | 153965 | 44881 | 43834 | 21967 |
| °F. | 673 | 750 | 659 | 201 | 201 | 201 | 596 | 579 | 579 | 635 | 601 |

TABLE I-continued

| Stream Feature | Feed (122) | Mixing Steam | Operating Steam (203) | Oily Steam (213) | Cut #1 | Reflux (218) | Cut #2 | Line 215 | Line 216 | Cut #3 | Bottoms |
|---|---|---|---|---|---|---|---|---|---|---|---|
| 50% Cut #2 | | | | | | | | | | | |
| Pounds/Day | 245746 | 9603 | 28794 | 38759 | 41621 | 91355 | 123406 | 158432 | 40848 | 64788 | 15569 |
| °F. | 673 | 750 | 659 | 201 | 201 | 201 | 574 | 565 | 565 | 630 | 598 |
| 50% Cut #3 | | | | | | | | | | | |
| Pounds/Day | 245746 | 9603 | 23354 | 33360 | 29055 | 101355 | 76192 | 87113 | 36902 | 123495 | 16601 |
| °F. | 673 | 750 | 659 | 201 | 201 | 201 | 564 | 545 | 545 | 620 | 600 |
| 15% Bottoms | | | | | | | | | | | |
| Pounds/Day | 245746 | 9603 | 20110 | 30001 | 40377 | 92340 | 106821 | 104094 | 62201 | 59855 | 38405 |
| °F. | 673 | 750 | 659 | 201 | 201 | 201 | 583 | 575 | 575 | 629 | 605 |

The typical and preferred operating ranges for the demetalizing and filtering steps of the preferred oil purification process are as set forth in the table on the page of U.S. Pat. No. 4,247,389 that contains columns 9 and 10. The disclosure of U.S. Pat. No. 4,247,389 is incorporated herein by reference.

The cuts resulting from the vacuum fractionation can be subjected to decolorization and deodorization as deemed necessary. The present invention is particularly useful since in many cases the oil cuts that will be used in a blending operation will not require the decolorization and deodorization step. The present invention is further advantageous in that the fractionation results in fractions which have been sufficiently devolatilized that they will generally meet flash point standards without further treatment.

A particularly preferred technique of purifying fractions from the vacuum fractionator, especially for the bottoms fraction, involves passing the fraction through a bed of adsorbent and then through a hydrotreater. The adsorbent can be bauxite, activated carbon, silica gel, clay, activated alumina, combinations thereof, and the like. The adsorbent serves to effect breakdown and decomposition of the ammonium salts of sulfonic acids and the ashless detergents contained in the oil. The adsorbent further serves to collect a small portion of the resulting products and thus precludes passage of such undesirable decomposition products to the hydrotreater. Such adsorbents can be regenerated by conventional means and reused.

Preferably, the adsorbent contains about 0.2 to about 20 weight percent of at least one metal selected from the group consisting of Group VIB and Group VIII metals, this weight percent being based on the total weight of modified adsorbent. This modified adsorbent can be prepared by impregnation of the adsorbent with an aqueous solution of a water-soluble compound on a Group VIB or Group VIII metal, followed by evaporation of water. Water-soluble compounds presently preferred for this use are iron compound such as ferric ammonium oxalate, ferric ammonium citrate, ferric sulfate, and ferrous ammonium sulfate.

From the foregoing it should be apparent that the present invention provides an improved method of purifying used lubricating oil. Reasonable variations and modifications can obviously be made without departing from the spirit and scope of the presently disclosed invention.

What is claimed is:

1. A fractionation column useful for the vacuum fractionation of used lubricating oil comprising an upper column section, a mid column section, and a lower column section, said upper column section being greater in diameter than the mid column section which in turn is greater in diameter than the lower column section, a plurality of oppositely spaced staggered plates each which extends about halfway across the mid column section from the walls of the mid column section, upper and lower withdrawal trays spaced apart in the upper column section, said upper tray being a partial liquid withdrawal tray, said lower tray being a total liquid withdrawal tray, an inlet for operating steam positioned beneath the lowermost of the plates in the mid column section, an inlet for oil feed positioned above the uppermost plate of the mid column section and below the total drawoff tray, an outlet for withdrawing liquid from the total withdrawal tray, a first liquid distributor positioned between said total withdrawal tray and said partial withdrawal tray, a conduit means for recycling liquid from said total withdrawal tray to said first liquid distributor, a second liquid distributor positioned between said total withdrawal tray and said inlet for the oil feed, a conduit means for recycling liquid from said total withdrawal tray to said second liquid distributor, a third liquid distributor located above said partial withdrawal tray, an outlet for taking overhead products from said column, a conduit means for recycling liquid from said overhead product to said third liquid distributor.

2. A column according to claim 1 containing a first layer of static mixing packing across the column between the feed inlet and said second liquid distributor, a second layer of static mixing packing across the column between said first liquid distributor and said total drawoff tray, a third layer of static mixing packing across the column between said first liquid distributor and said partial drawoff tray, and a fourth layer of static mixing packing across the column between said partial drawoff tray and said third liquid distributor.

3. A column according to claim 2 wherein said static mixing packings comprise sulzer packing.

4. A column according to claim 3 wherein said lowermost static mixing packing comprises a layer of sulzer packing over a layer of intalox saddles.

5. A column according to claim 4 wherein the diameter of the upper column section is about 2.2 times the diameter of the mid column section, the diameter of the mid column section is about 1.5 times the diameter of the lower column section, the height of the mid section of the column is about twice that of the lower column section, and the height of the upper column section is about 13.3 times that of the lower section.

6. A column according to claim 5 wherein the inlet for feed in the upper column section opens into a feed distributor which comprises a plate extending outwardly from the interior wall of the upper column section, the innermost edge of which defines an arc equidistant from the adjoining wall of the column, said edge having a weir extending upwardly therefrom.

7. A column according to claim 6 wherein the plate of said feed distributor extends outwardly from about a third of the circumference of the upper section column wall and the weir thereof extends upwardly about 18 inches.

8. A column according to claim 7 wherein the upper column section is about 40 feet in height, the first layer of static mixing packing is about 42 inches above the bottom of the upper section and comprises a 2 foot layer of sulzer resting on a 1 foot layer of intallox saddles; the second layer of static mixing packing is about 72 inches above the top of the first layer of packing and comprises a 4 foot layer of sulzer; the third layer of packing is about 42 inches above the top of the second layer of packing and comprises a 4 foot bed of sulzer; and the fourth layer of packing is about 69 inches above the top of the third layer of packing and comprises a 6 foot layer of sulzer.

9. A column according to claim 8 wherein the plates in the mid column section each extend half way across the mid column section.

* * * * *